United States Patent Office 3,439,003
Patented Apr. 15, 1969

3,439,003
1,5-BIS-(2',4'-DIHALO-BENZAMIDO)-4-HYDROXY (AND 4,8-DIHYDROXY)-ANTHRAQUINONES
Ernst Reich, Bettingen, and Hans Rudolf Rickenbacher, Basel, Switzerland, assignors to Ciba Limited, Basel, Switzerland, a Swiss company
No Drawing. Filed Mar. 23, 1965, Ser. No. 442,206
Claims priority, application Switzerland, Mar. 26, 1964, 3,975/64
Int. Cl. C09b *1/42;* C09c *1/00*
U.S. Cl. 260—377                   2 Claims

ABSTRACT OF THE DISCLOSURE

Anthraquinone dyestuffs of the formula

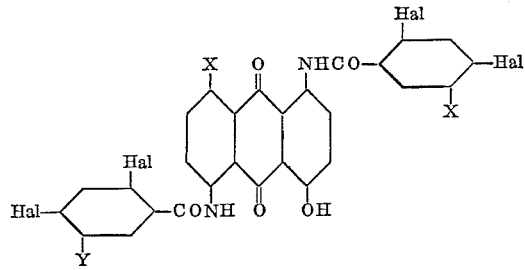

in which X is hydrogen or hydroxyl, Y is hydrogen or halogen, and Hal is halogen, are obtainable when 1:5-diamino-4:8-dihydroxyanthraquinone or 1:5-diamino-4-hydroxyanthraquinone is condensed in a molar ratio of 1:2 with a 2:4-di-halogen benzoyl halide.

---

The present invention is based on the observation that valuable anthraquinone dyestuffs of the formula

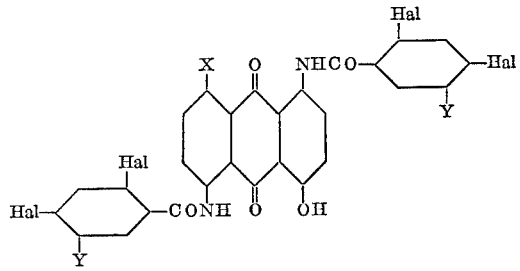

in which X represents a hydrogen atom or a hydroxyl group, Y represents a hydrogen or halogen atom and Hal represent halogen atoms, are obtainable when 1:5-diamino-4:8-dihydroxyanthraquinone or 1:5-diamino 4-hydroxyanthraquinone is condensed in a molar ratio of 1:2 with a 2:4-di-halogen benzoyl halide.

The carboxylic acid halide used may be, for example,
2:4-dibromobenzoyl chloride,
2-bromo-4-chlorobenzoyl chloride,
4-bromo-2-chlorobenzoyl chloride,
2:4-difluorobenzoyl chloride,
2-fluoro-4-benzoyl chloride,
2-chloro-4-fluorobenzoyl chloride,
2:4:5-trichlorobenzoyl chloride and especially
2:4-dichlorobenzoyl chloride.

The reaction is advantageously carried out at a raised temperature in an inert organic solvent, for example, nitrobenzene, chlorobenzene or ortho-dichlorobenzene. Instead of starting from ready-made 2:4-di-halogen benzoyl chloride, it is advantageous to prepare the acid chloride by reacting the 2:4-di-halogen benzoic acid with thionyl chloride and then to carry out condensation of the acid chloride with the diaminoanthraquinone in the same vessel, that is to say, without isolation of the acid chloride.

The dyestuffs so obtained can be used for dyeing a very wide variety of materials; for example, they can be used as vat dyestuffs for dyeing cellulose fibers. In particular, however, they are very suitable for use as pigments and, by virtue of their excellent fastness to light and good fastness to migration, they can be used for a very wide variety of purposes. For example, they can be used in a state of fine division for the spin-coloration of filament and staple fiber viscose rayon, cellulose ethers and ester, polyamides, polyurethanes and polyesters, as well as in the preparation of colored lacquers and lake former, solutions and products made from cellulose acetate, nitrocellulose, natural resins and synthetic resins, for example, polymerization resins and condensation resins, for example, aminoplasts, alkyd resins, phenoplasts, polyolefins, for example, polystyrene, polyvinyl chloride, polyethylene, polypropylene, polyacrylonitrile, rubber, casein, silicones and silicone resins. They can also be used with advantage in the preparation of colored pencils, cosmetic preparations and laminated sheet material.

The following example illustrates the invention. Unless otherwise stated, the parts and percentages are by weight.

Example

A mixture comprising 300 parts of nitrobenzene, 42 parts of 2:4-dichlorobenzoic acid, 0.5 part of dimethylformamide and 28.6 parts of thionyl chloride is introduced into a glass apparatus provided with stirring means, thermometer and reflux condenser, the temperature is raised to 140° C. in the course of one hour and the mixture is kept at that temperature for a further hour. It is allowed to cool to 100° C., and then dry air is conducted through the apparatus for 5 minutes. 27.0 parts of finely pulverized 1:5-diamino-4:8-dihydroxy-anthraquinone are then introduced at the same temperature, the temperature is raised to 200 to 210° C. in the course of one hour, and the reaction mixture is kept at that temperature for 2 hours. The precipitated dyestuff is isolated by filtration at 200° C. on a preheated suction filter, and the product is washed twice with nitrobenzene at 200° C., 50 parts of nitrobenzene being used each time. It is then washed with methanol until nitrobenzene is no longer present. 60 parts of 1:5-di-(2:4-dichlorobenzoylamino)-4:8-dihydroxyanthraquinone are obtained. After recrystallization from nitrobenzene, followed by recrystallization from γ-butyrolactone, analysis of the pigment yields the following:
Calculated: C, 54.57%; H, 2.29%; N, 4.55%; Cl, 23.01%. Found: C, 54.41%; H, 2.38%; N, 4.63%; Cl, 23.20%.

The pigment yields reddish violet tints possessing a very good fastness to migration and an excellent fastness to light when used for the mass-coloration of polyvinyl chloride. It also yields reddish violet spun-colored cellulosic fibers possessing very good properties of wet fastness and a very good fastness to light when dispersed in the viscose spinning composition.

By using, in the first paragraph above, 1:5-diamino-4-hydroxyanthraquinone instead of 1:5-diamino-4:8-dihydroxyanthraquinone, 1:5-di-(2:4-dichlorobenzoylamino)-4-hydroxyanthraquinone is obtained which colors polyvinyl chloride red tints possessing an excellent fastness to light.

By replacing, in the first paragraph above, the 2:4-dichloro-benzoic acid with 49.6 parts of 2:4:5-trichlorobenzoic acid, a pigment is obtained that produces similar tints likewise possessing a very good fastness to migration and to light when used for the mass-coloration of polyvinyl chloride. It also produces very similar red-violet tints possessing very good properties of wet fastness and a very good fastness to light when used for the spin-coloration of viscose rayon.

Dyeing prescription I

A mixture is prepared from 65 parts of polyvinyl chloride, 35 parts of dioctyl phthalate and 0.2 part of the dyestuff obtained in the manner described in the first paragraph of the example, and the said mixture is worked to and fro for 7 minutes at 140° C. on a two-roller mill. A violet film possessing a very good fastness to light and to migration is obtained. No change in shade is detectable, even after exposure for 1,000 hours in a Fadeometer.

Dyeing prescription II 0.25 part of the dyestuff obtained in the manner described in the first paragraph of the example, 40 parts of an alkyd-melamine stoving enamel having a 50% solids content, and 4.75 parts of titanium dioxide are ground for 24 hours in a rod mill. A thin layer of the lacquer so prepared is applied to aluminum foil and stoved for one hour at 120° C. A violet coating possessing a very good fastness to light is obtained.

What is claimed is:
1. An anthraquinone dyestuff of the formula

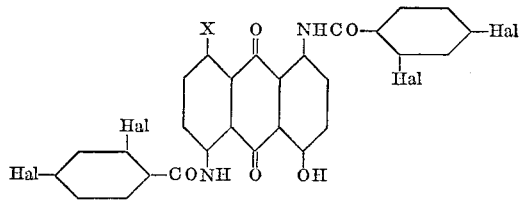

in which Hal is halogen and X is a member selected from the group consisting of hydrogen and hydroxy.

2. The dyestuff of the formula

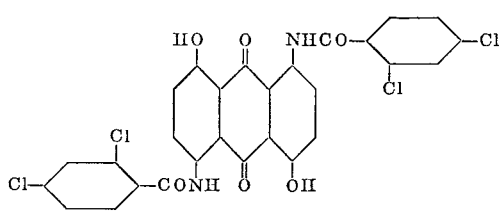

References Cited

UNITED STATES PATENTS

| 3,344,154 | 9/1967 | Aldridge | 260—377 |
| 2,420,453 | 5/1947 | Sutter et al. | 260—377 |

FOREIGN PATENTS

| 225,232 | 8/1910 | Germany. |
| 226,940 | 10/1910 | Germany. |

OTHER REFERENCES

Grandmougin, M. E., Comptes Rendus des Seances, vol. 175. Paris: Gauthier-Villars et C. (1922), pp. 970–973.

LORRAINE A. WEINBERGER, *Primary Examiner.*

H. C. WEGNER, *Assistant Examiner.*

U.S. Cl. X.R.

106—288; 260—37